(12) United States Patent
Kumar et al.

(10) Patent No.: US 11,452,173 B2
(45) Date of Patent: Sep. 20, 2022

(54) REMOTE RADIO HEAD, BEAMFORMING METHOD AND STORAGE MEDIUM

(71) Applicant: NEC Corporation, Tokyo (JP)

(72) Inventors: Dileep Kumar, Tokyo (JP); Kazushi Muraoka, Tokyo (JP); Naoto Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 156 days.

(21) Appl. No.: 16/652,731

(22) PCT Filed: Oct. 4, 2017

(86) PCT No.: PCT/JP2017/036127
§ 371 (c)(1),
(2) Date: Apr. 1, 2020

(87) PCT Pub. No.: WO2019/069395
PCT Pub. Date: Apr. 11, 2019

(65) Prior Publication Data
US 2020/0245412 A1    Jul. 30, 2020

(51) Int. Cl.
*H04W 88/08* (2009.01)
*H04B 7/024* (2017.01)
*H04B 7/06* (2006.01)
*H04W 16/28* (2009.01)
*H04W 24/02* (2009.01)

(52) U.S. Cl.
CPC .......... *H04W 88/085* (2013.01); *H04B 7/024* (2013.01); *H04B 7/0617* (2013.01); *H04W 16/28* (2013.01); *H04W 24/02* (2013.01)

(58) Field of Classification Search
None
See application file for complete search history.

(56) References Cited

U.S. PATENT DOCUMENTS

| 6,330,460 | B1 | 12/2001 | Wong et al. |
| 8,811,461 | B1* | 8/2014 | Huynh ............... H04B 17/0085 375/224 |
| 9,485,770 | B2 | 11/2016 | Banu et al. |

(Continued)

FOREIGN PATENT DOCUMENTS

| EP | 1185003 A2 | 3/2002 |
| EP | 1365618 A1 | 11/2003 |

(Continued)

OTHER PUBLICATIONS

International Search Report for PCT Application No. PCT/JP2017/036127, dated Jun. 15, 2018.

(Continued)

*Primary Examiner* — Jeffrey M Rutkowski
*Assistant Examiner* — Ning Li
(74) *Attorney, Agent, or Firm* — Sughrue Mion, PLLC

(57) ABSTRACT

Provided a Remote Radio Head (RRH) with multiple antennas generating a plurality of analog beams in a wireless communication system serving at least one user terminal, including a metric calculator that calculates at least one metric representing a traffic demand as a function of spatial direction by using at least a signal of each Radio Frequency chain and a beam former that generates analog beams directed towards a spatial direction determined based on the calculated at least one metric.

17 Claims, 18 Drawing Sheets

(56) References Cited

U.S. PATENT DOCUMENTS

| | | | | |
|---|---|---|---|---|
| 10,153,660 | B1* | 12/2018 | Leabman | H02J 50/40 |
| 2013/0301454 | A1* | 11/2013 | Seol | H04B 7/0695 |
| | | | | 370/252 |
| 2014/0334566 | A1* | 11/2014 | Kim | H04B 7/0695 |
| | | | | 375/267 |
| 2015/0085944 | A1* | 3/2015 | Mobasher | H04B 7/0413 |
| | | | | 375/267 |
| 2015/0110049 | A1 | 4/2015 | Pabla | |
| 2015/0289281 | A1* | 10/2015 | Kim | H04W 72/085 |
| | | | | 375/267 |
| 2016/0021549 | A1 | 1/2016 | Subramanian et al. | |
| 2016/0021650 | A1 | 1/2016 | Chembil-Palat et al. | |
| 2016/0294533 | A1* | 10/2016 | Ridel | H04B 1/525 |
| 2016/0353424 | A1* | 12/2016 | Stirling-Gallacher | |
| | | | | H04B 7/0626 |
| 2017/0054222 | A1 | 2/2017 | Corman et al. | |
| 2017/0070966 | A1* | 3/2017 | Ganesan | H04W 52/52 |
| 2017/0134131 | A1* | 5/2017 | Sharma | H04B 7/0617 |
| 2017/0230910 | A1 | 8/2017 | Kimura | |
| 2017/0288910 | A1* | 10/2017 | Iura | H04L 25/0232 |
| 2017/0353200 | A1* | 12/2017 | Shen | H03F 3/211 |
| 2017/0358866 | A1* | 12/2017 | Xian | H01Q 1/38 |
| 2018/0019789 | A1* | 1/2018 | Hyslop | H04B 7/0617 |
| 2018/0331740 | A1* | 11/2018 | Orhan | H04B 17/102 |
| 2018/0332541 | A1* | 11/2018 | Liu | H04W 52/241 |
| 2019/0020401 | A1* | 1/2019 | Gharavi | H04B 7/15528 |
| 2019/0089428 | A1* | 3/2019 | Bethanabhotla | H04B 7/0608 |
| 2020/0091608 | A1* | 3/2020 | Alpman | H01Q 1/38 |
| 2020/0220628 | A1* | 7/2020 | Vella-Coleiro | G01R 29/105 |
| 2021/0067224 | A1* | 3/2021 | Yuan | H04B 7/0665 |

FOREIGN PATENT DOCUMENTS

| | | |
|---|---|---|
| EP | 2282574 A2 | 2/2011 |
| JP | 2003-283418 A | 10/2003 |
| JP | 2008-270940 A | 11/2008 |
| JP | 2017-143320 A | 8/2017 |
| JP | 2017-525286 A | 8/2017 |
| WO | 00/79821 A1 | 12/2000 |
| WO | 2017/063661 A1 | 4/2017 |

OTHER PUBLICATIONS

Written opinion for PCT Application No. PCT/JP2017/036127.
Japanese Office Action for JP Application No. 2020-518821 dated Jun. 8, 2021 with English Translation.
Japanese Office Communication for JP Application No. 2020-518821 dated Jan. 4, 2022 with English Translation.

* cited by examiner

REMOTE RADIO HEAD, BEAMFORMING METHOD AND STORAGE MEDIUM

TECHNICAL FIELD

The present invention relates to a Remote Radio Head (RRH), a beamforming method and a storage medium storing a program, and more particularly to a RRH, a beamforming method and a storage medium storing a program for estimating traffic demand.

BACKGROUND

Distributed Base Transceiver Stations (BTSs) with a Remote Radio Head (RRH) greatly help mobile operators to solve performance and efficiency challenges with a reasonable cost. The RRH is termed 'Remote' as it is usually installed on a location that is physically some distance from a Base Band Unit (BBU). The RRH mainly includes Radio Frequency (RF) functionalities of a BTS. Further, the RRH is connected to remaining baseband processing part in the BBU by a bidirectional radio interface.

Generally, each RRH covers a wider region in azimuth plane and comparatively narrower in elevation plane. Where, mobile operators can optimize a tilt-angle to some specified range supported by Remote Electrical Tilt (RET) feature of the RRH. However, the RET requires continuous human monitoring by using some external devices and further it is not adaptive to a dynamic change of traffic pattern in coverage area of the BTS.

With large array active antennas, multi-input multi-output (MIMO) architecture, coverage can be adaptively adjusted to the dynamic change of traffic pattern in both azimuth and elevation plane by applying three-dimensional (3D) beamforming. However, such architecture requires a heavy signal processing and typically increases a hardware and software complexity by ten-folds because of large number Radio Frequency (RF) circuits in the RRH. Further, such architecture also requires a precise coordination between beamforming and user scheduling (refer to Patent Literature (PTL) 1), and that results significantly higher coordination overhead between higher and lower layers in a mobile communication system. In addition to that, such architecture may not be compatible with current high speed mobile communication standards and hardware.

PTL 3 discloses full-digital beamforming architecture to estimate network traffic (FIG. 8). In PTL 3, angle of arrival (AoA) estimation is performed using only uplink signals.

Recently a new approach has been proposed in the literature for adaptive adjustment of coverage in both azimuth and elevation plane. The approach is based on integration of phased-array antennas to each RF circuit and then applying appropriate weightings to generate directional analog beam(s) to match user density distribution and/or traffic demands in the coverage area. It also provides analog beamforming gain on the top of conventional digital precoding. Such architectures are termed as Hybrid Analog-Digital beamforming in the wireless and mobile communication literature.

Hybrid Analog-Digital beamforming architecture applies two-level beamforming such as; a coarse level analog beamforming with phased-array antennas and a fine-level digital beamforming using baseband processing. Methods like joint optimizations of analog beamforming and digital precoding using channel state information (CSI) from the BBU have been studied in the literature. However, such methods require a tight integration between the BBU and the RRH functionalities.

However, such a tight integration may not be possible without modifications in a current BBU hardware and functionalities. To overcome this problem, PTL 2 discloses a method for estimating a traffic demand and/or user density distribution within the RRH without any help of the BBU. This method is based on tapping a radio interface bus and estimating the user density distribution from the raw data flowing through the radio interface bus connecting the BBU and the RRH.

CITATION LIST

Patent Literature

[PTL 1]
U.S. Pat. No. 9,485,770B2
[PTL 2]
United States Patent Application Publication No. US2016/0021650A1
[PTL 3]
European Patent Application Publication No. 2282574A2

SUMMARY

Technical Problem

According to the background, method for adaptive adjustment of the coverage in azimuth plane and/or elevation plane without support of the BBU or external devices requires tapping of the radio interface bus that connects the BBU and the RRH, as described in PTL2. Such method may not be architecturally efficient as it requires duplication of radio interface bus decoder functionalities. In addition to that, a precise timing and frame synchronization is very important for estimating the traffic demand and/or user density distribution from the tapping of raw data flowing through the radio interface bus between the RRH and the BBU.

One possible example of such bidirectional radio interface bus connecting the RRH and the BBU can be Common Public Radio Interface (CPRI). The CPRI requires a strict synchronization with timing accuracy of around 8.138 nsec, in order to accurately descramble and decode the data at the RRH.

One of an object of the present disclosure is providing a Remote Radio Head which contributes to adaptively adjust coverage to match traffic demands in an architecturally efficient way.

Solution to Problem

According to a first aspect, there is provided a remote radio head with multiple antennas generating a plurality of analog beams in a wireless communication system serving at least one user terminal, includes: a metric calculation unit (metric calculator) configured to calculate at least one metric representing a traffic demand as a function of spatial direction by using signals of each Radio Frequency chain; and a beamforming unit (beam former) configured to generate analog beams directed towards spatial direction of high traffic demand based on the calculated at least one metric.

According to a second aspect, there is provided a beamforming method performed in a remote radio head with multiple antennas generating a plurality of analog beams in a wireless communication system serving at least one user terminal, the method including: calculating at least one metric representing a traffic demand as a function of spatial direction by using signals of each Radio Frequency chain; and generating analog beams directed towards spatial direction of high traffic demand based on the calculated at least one metric.

According to a third aspect, there is provided a storage medium storing a program executed by a computer embedded on a remote radio head with multiple antennas generating a plurality of analog beams in a wireless communication system serving at least one user terminal, the program causes the computer to execute: calculating at least one metric representing a traffic demand as a function of spatial direction by using signals of each Radio Frequency chain; and generating analog beams directed towards spatial direction of high traffic demand based on the calculated at least one metric.

The above-mentioned program can be recorded in a computer-readable storage medium. The storage medium may be a non-transient medium such as a semiconductor memory, a hard disk, a magnetic recording medium, or an optical recording medium. The present invention can be embodied as a computer program product.

Advantageous Effects of Invention

According to the present disclosure, a Remote Radio Head (RRH) which contributes to adaptively adjusts coverage to match traffic demands in an architecturally efficient way.

MODES

Figure 1:
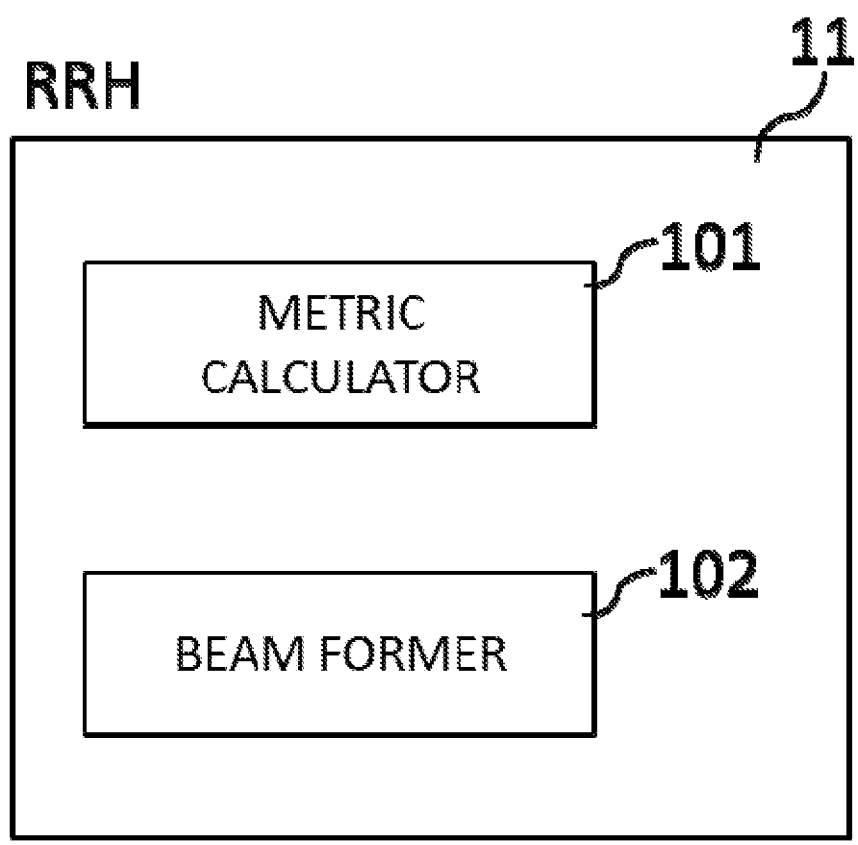
FIG. 1 illustrates an outline of an example embodiment.

First, an outline of an example embodiment will be described with reference to FIG. 1. In the following outline, various components are denoted by reference characters for the sake of convenience. Namely, the following reference characters are merely used as examples to facilitate understanding of the present invention. Thus, the present disclosure is not limited to the description of the following outline. In addition, connecting lines between blocks in each figure include both bidirectional and unidirectional. One-way arrow schematically shows a flow of a main signal (data), and does not exclude bidirectionality. In addition, in this document, "and/or" represents at least one of preceding and following elements of this expression. For example, "item 1 and/or item 2" indicates "at least one of item 1 and item 2".

A Remote Radio Head (RRH) 11 with multiple antennas generating a plurality of analog beams in a wireless communication system serving at least one user terminal. The RRH 11 includes a metric calculator 101 and a beam former 102. The metric calculator 101 is configured to calculate at least one metric representing a traffic demand as a function of spatial direction by using signals of each Radio Frequency chain. The beam former 102 is configured to generate analog beams directed towards spatial direction of high traffic demand based on the calculated at least one metric. It should be noted that the RF chain is a circuit module in which circuits for modulation or demodulation of analog and digital signals are connected in cascade.

The RRH 11 in mobile communication system includes the metric calculator 101 configured to calculate at least one metric by using signals related to the Radio Frequency chain. For example, any one of signals inputted to each Radio Frequency chain, signals outputted from each Radio Frequency chain and signals within each Radio Frequency chain is used for calculating the metric. Further, the signals for calculating the metric can be obtained in analog or digital domain. The RRH 11 further includes the beam former 102 configured to optimize coverage by aligning the analog beamforming towards a regions of higher traffic demand (high user density distribution) in both elevation plane and azimuth plane. Therefore, coverage is optimized to the regions of higher traffic demand by analog beamforming in order to maximize users Quality of Service and system throughput.

As a result, the RRH 11 eliminates duplication of radio interface decoder functionalities and more a precise synchronization to a BBU encoder. This is because of estimating the traffic demand from the signals of each RF circuit (RF chain). In addition to that, all additional components required for estimation of traffic demand from analog signals of each RF circuit can easily be integrated in a single chip with phased-array antennas and thus provides a comparatively very compact architecture. That is, the RRH 11 adaptively adjusts coverage to match traffic demands in an architecturally efficient way.

Example Embodiment

The present disclosure and its advantages can further be understood with a help of following description. In the following, example embodiments of the present disclosure are described with reference to the drawings. For illustrating the present disclosure, example embodiments are constructed by assuming its application to a mobile communication system.

First, a mobile communication system and a user terminal, which are used in common for describing the present disclosure, are explained in details by making reference to FIG. 2 to FIG. 9.

Figure 2:
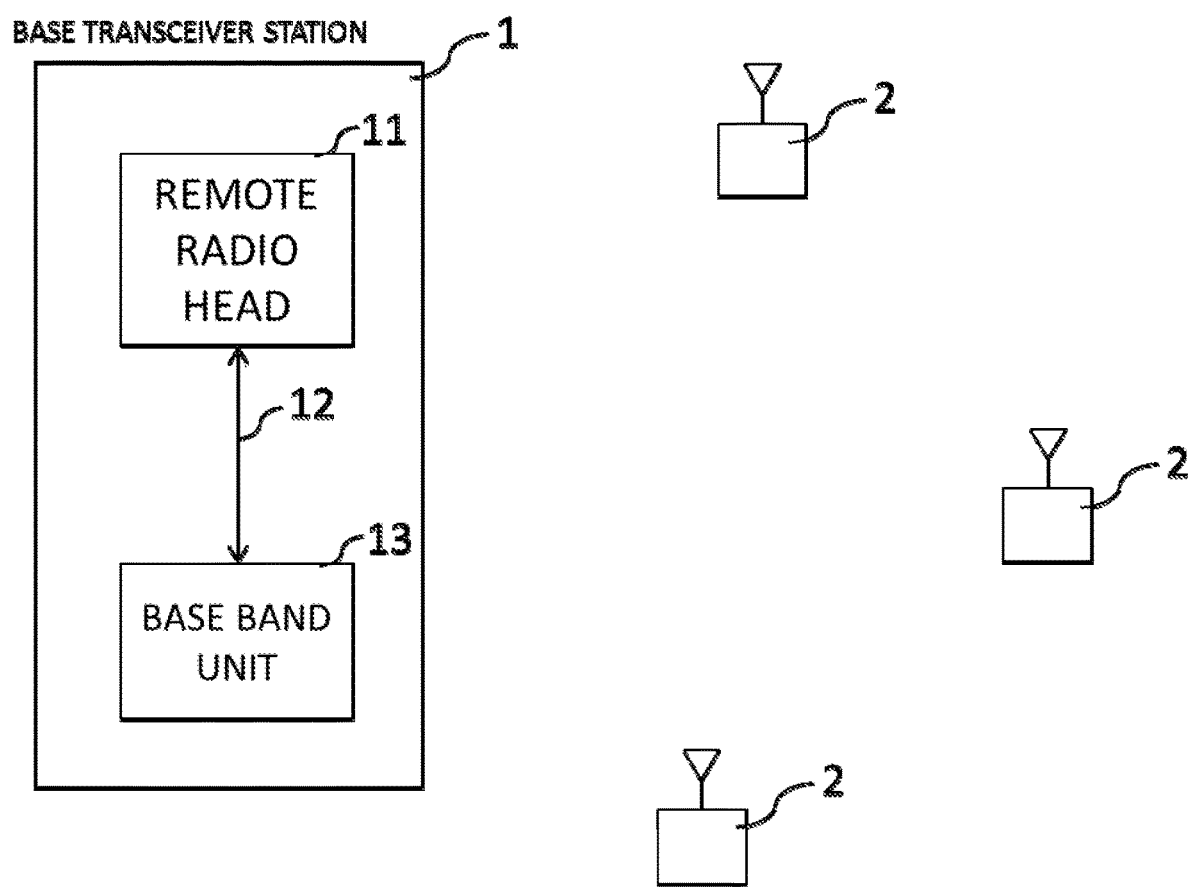
FIG. 2 illustrates an example of a mobile communication system including a base transceiver station and a plurality of user terminals.

FIG. 2 shows an example illustration of a mobile communication system that includes a Base Transceiver Station (BTS) 1 and User Terminals (UTs) 2. Note that, usage of the UTs 2 with a single antenna is only for illustrative purpose, and the present disclosure can be applied to a system with any number antennas at the UTs 2 by a skilled person in the art. The UTs 2 are located in the BTS 1 radio coverage area and can communicate with the BTS 1 in both uplink and downlink direction.

The BTS 1 includes a Remote Radio Head (RRH) 11 and a Base Band Unit (BBU) 13. The RRH 11 and the BBU 13 can be deployed at the same location or on different locations, and both are connected with each other by a bidirectional radio interface bus 12.

Figure 3:
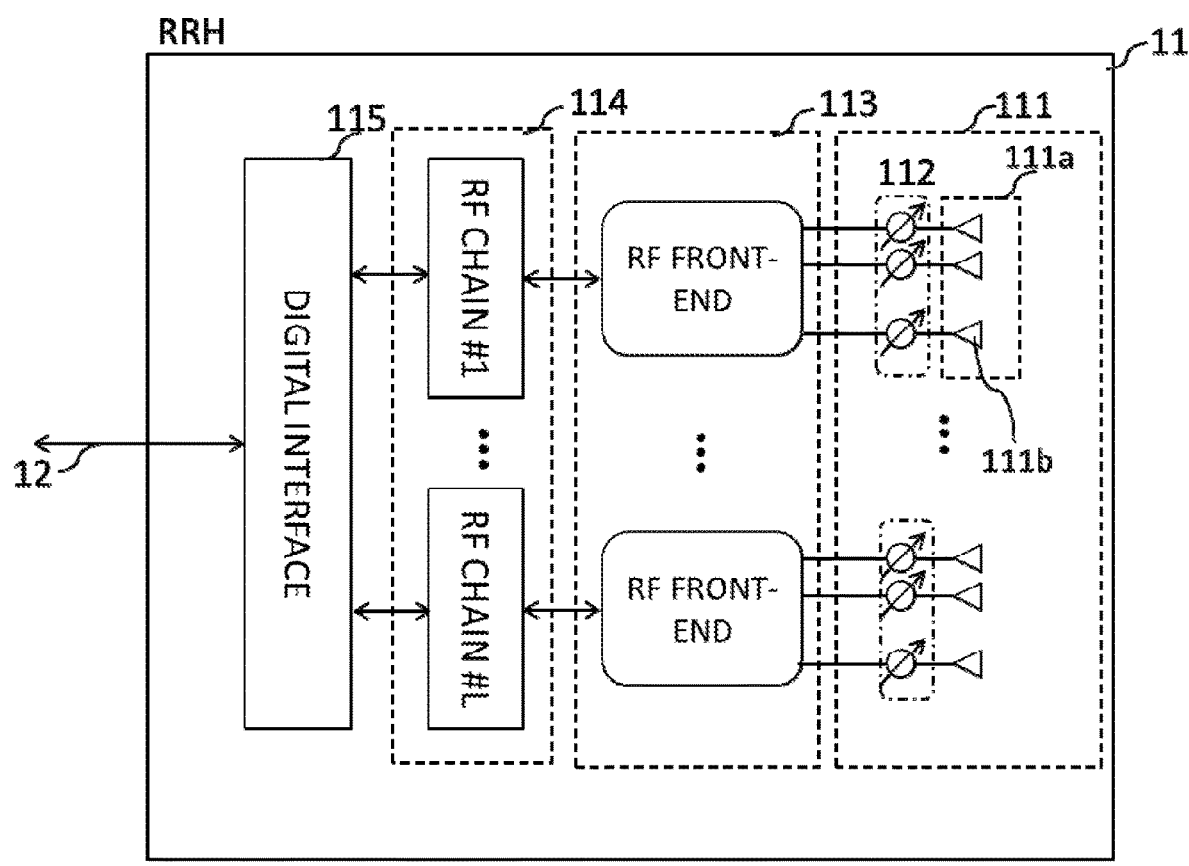
FIG. 3 illustrates an example block diagram of Remote Radio Head in base transceiver station.

FIG. 3 shows an example diagram of the RRH 11. Referring to FIG. 3, the RRH 11 includes antennas (RRH antennas) 111, RF front-ends 113, RF chains 114 and a digital interface 115. L RF chains 114 and L RF front-ends 113 are included in the RRH 11 (L is a number of RF chains and RF front-ends existing in the RRH 11). Antennas 111 include a plurality of sub-arrays 111a and a plurality of phase-shifters (analog phase-shifters) 112. In addition, each sub-array 111a including a plurality of antenna elements 111b is connected to each RF front-end 113. The antennas 111 are used for both receiving uplink signals and transmitting downlink signals from and to the UT 2, respectively. The reception of the uplink signals and transmission of the downlink signals can be multiplexed in time or frequency, which is controlled by the RF front-end 113.

Figure 4:
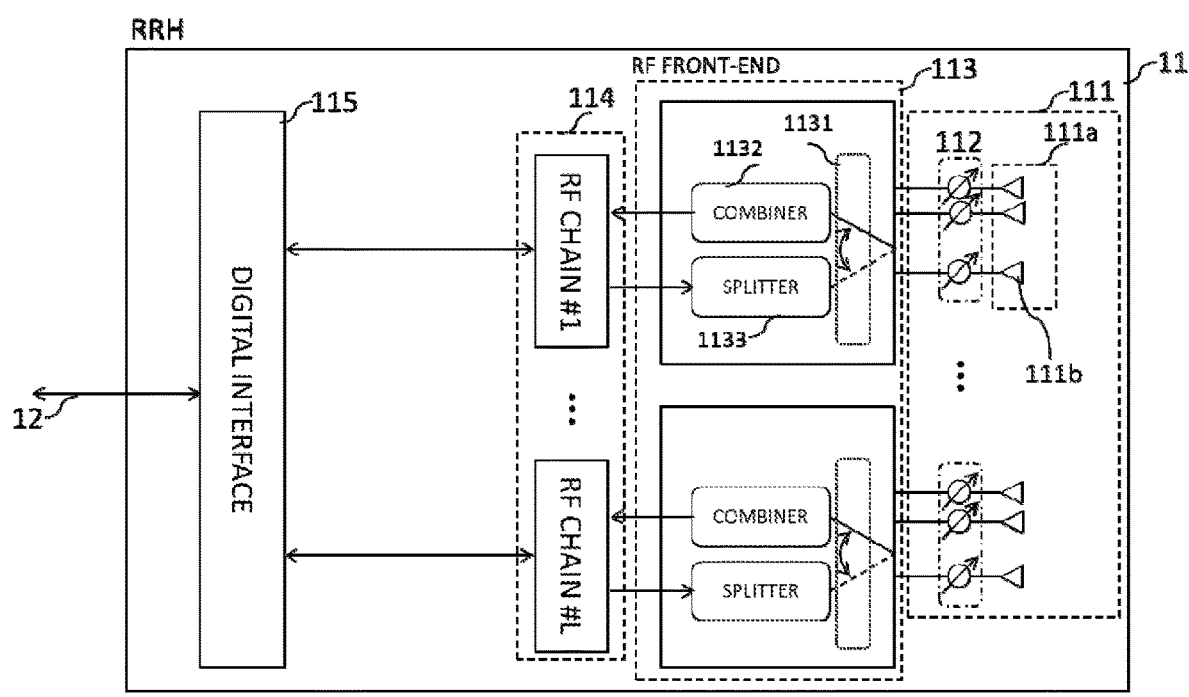
FIG. 4 illustrates an example block diagram of a Remote Radio Head in Time Division Duplex system.
Figure 5:
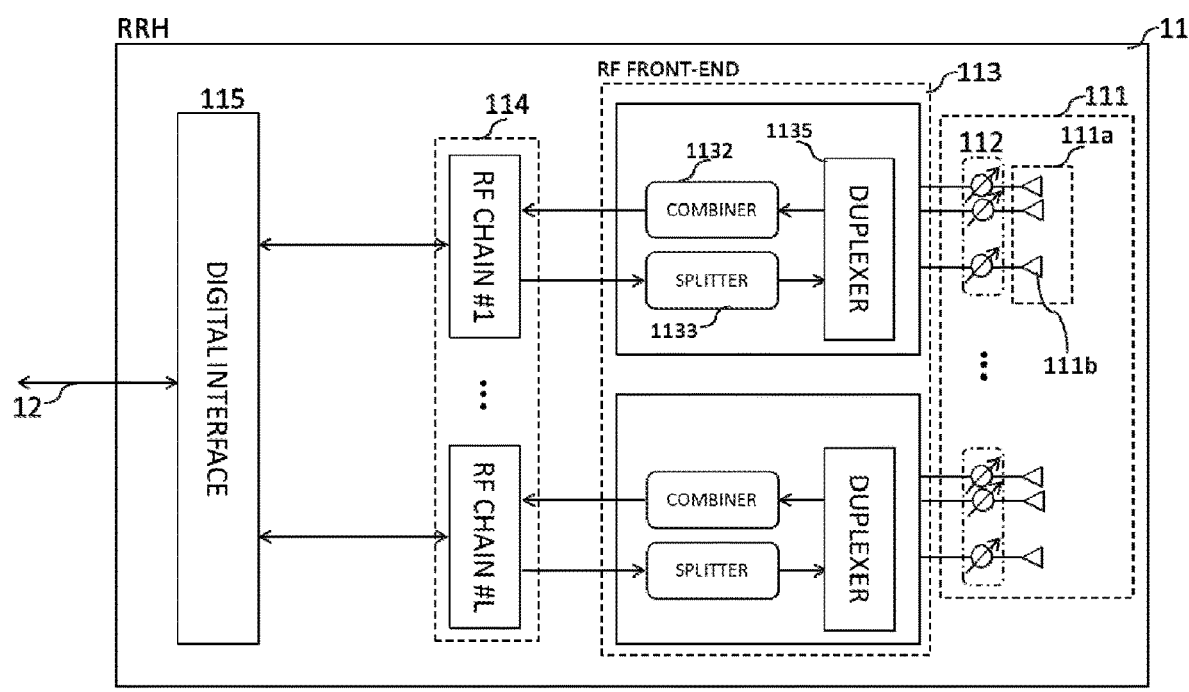
FIG. 5 illustrates an example block diagram of a Remote Radio Head in Frequency Division Duplex system.

FIGS. 4 and 5 illustrate an example block diagram for Time Division Duplex (TDD) system and Frequency Division Duplex (FDD) system, respectively. For example, in a case of TDD system, same antenna 111 can be used for both reception of uplink signals and transmission of downlink signals, where the reception and transmission is controlled by a receive/transmit switch 1131, as shown in FIG. 4.

In a case of FDD system, all the antennas 111 can be used for both transmission of downlink signals to the UTs 2 and reception of uplink signals from the UTs 2. FIG. 5 illustrates the example diagram of the RRH 11 in FDD system in which transmission of downlink signals and reception of uplink signals are performed on separate frequencies at the same time, where a duplexer 1135 separates the receive frequency components from the transmit frequency components.

Figure 6:
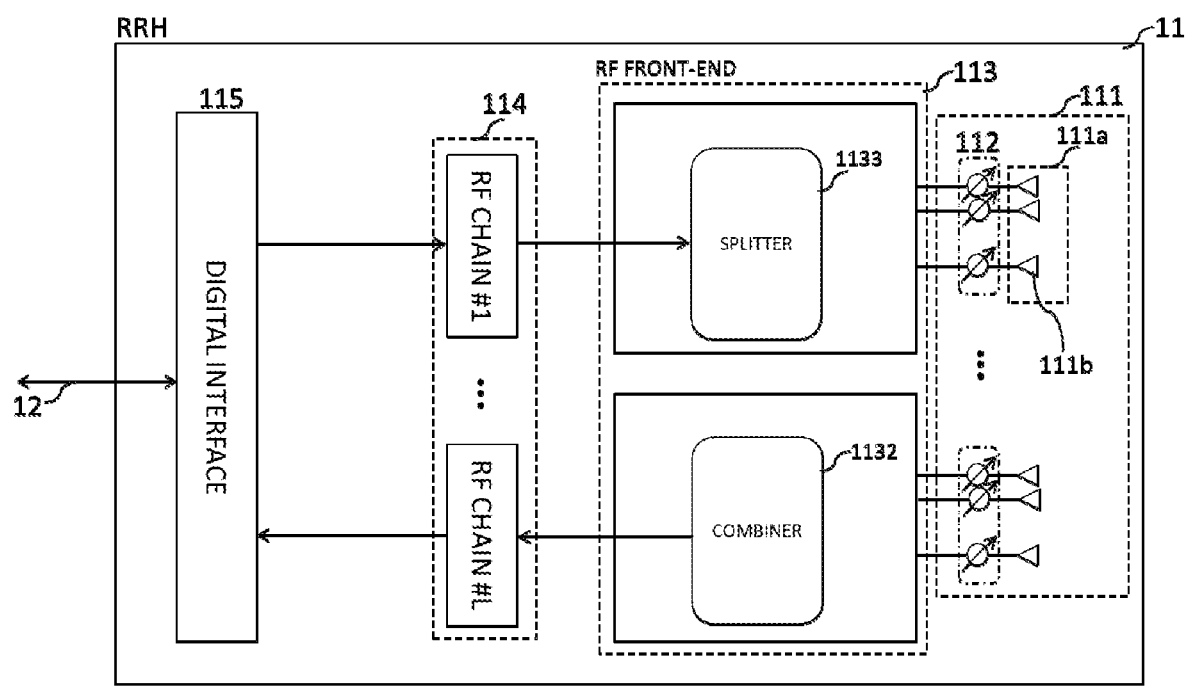
FIG. 6 illustrates an example block diagram of Remote Radio Head in Frequency Division Duplex systems with reserved antennas for uplink and downlink.

In addition to that, for FDD system, some of the antennas 111 can be exclusively used for receiving uplink signals while other antennas 111 are reserved for transmitting downlink signals as shown in FIG. 6.

Figure 7:
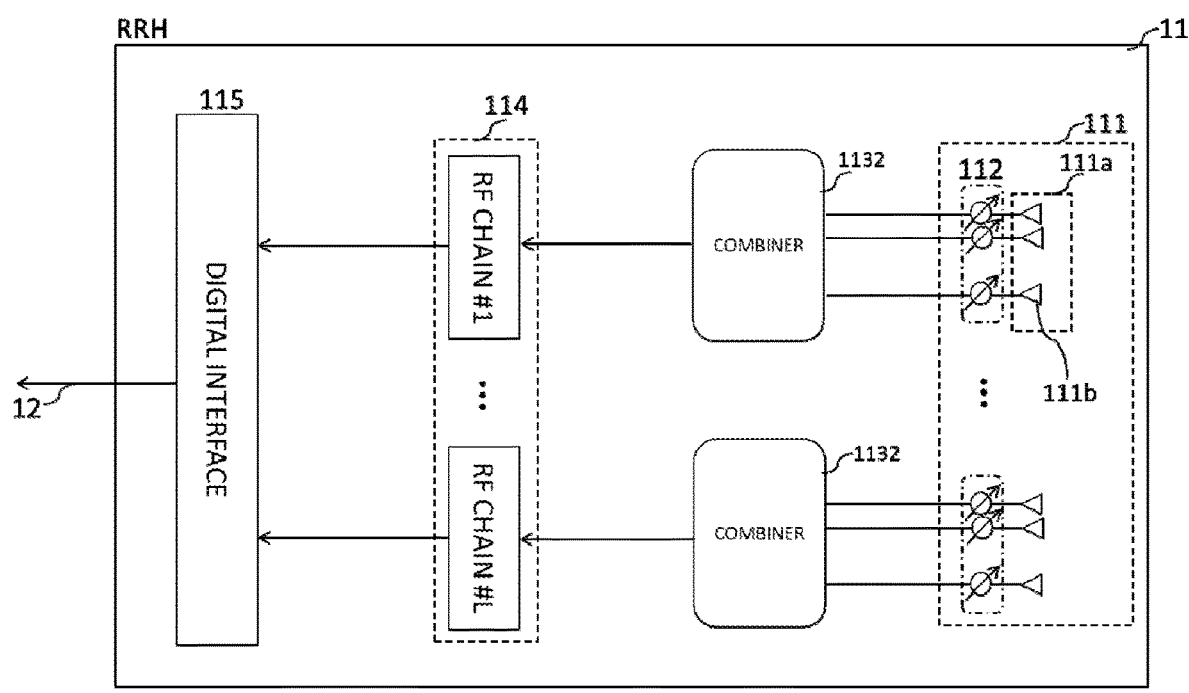
FIG. 7 illustrates an example block diagram of Remote Radio Head for uplink data reception.

Here, an example block diagram shown in FIG. 7 illustrates the RRH 11 for uplink reception only. In the case of only uplink reception, all antennas 111 are integrated to combiner 1132 for combining the received signals of each antenna element 111b in the phased-array 111a.

Figure 8:
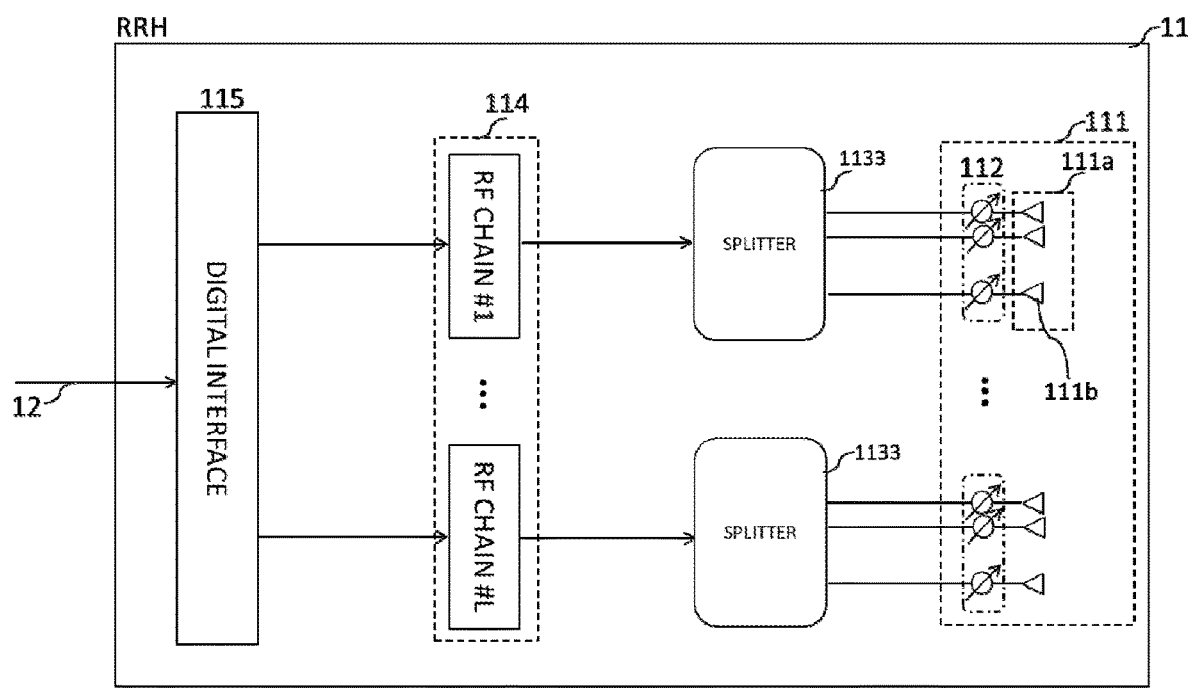
FIG. 8 illustrates an example block diagram of Remote Radio Head for downlink data transmission.

Similarly for downlink transmission, signals from each RF chain 114 are split by a splitter 1133 as shown in FIG. 8.

Note that, a detailed block diagram and operation of RF front-end 113 for both TDD system and FDD system are well known to a skilled person in the art. Therefore, detailed explanation of the RF front-end 113 is omitted in this document.

It should be noted here that, total number (N) of antenna 111 are comparatively much higher than the number (L) of RF chain 114, i.e., N>>L. A connection between antennas 111 and RF chains 114 can be realized in several ways. One of a possible approach is when all antennas 111 connect to each RF chain 114, such that the transmitted and/or received signals goes through all the RF paths, such architectures are called full-array architectures in wireless and mobile communication literature.

Another possible approach is splitting total antennas 111 into sub-arrays of equal size or different sizes and each sub-array connects to separate RF chain 114, such architectures are known as sub-array architectures in wireless and mobile communication literature.

There can be several other approaches to connect antennas 111 with the RF chains 114, however, the present disclosure can easily be applied, irrespective of the approach or method for connecting antennas 111 with RF chains 114 by a skilled person in the art.

Each antenna element 111b in the sub-array 111a is connected to the phase-shifter 112. For illustration purpose, here we consider linear array, however, the present disclosure is valid for other array configurations such as rectangular, square and/or circular. The received (transmitted) signals from individual antenna element 111b are phase-shifted and then combined (split) to provide an output of sub-array 111a, which is called analog beamforming.

The RRH 11 can generate one or more, wider beams and/or narrower beams and can steer beams to any spatial direction by applying corresponding beamforming weights including both phase-shift and amplitude to antenna element 111b in each sub-array 111a. It should be noted here, the use of the phase-shifters 112 is only for illustrative purpose, and the present disclosure can be applied to a system with butler matrix or other similar network used for generating analog beamforming by a skilled person in the art.

It should be noted here, a maximum number of simultaneous analog beams of the RRH 11 are always upper bounded by the number of the RF chains 114. In other words, at maximum only L different spatial directions can be selected simultaneously, where L is the total number of RF chains 114.

Further in the case of TDD system, all of the analog beams can be used for both uplink and downlink in different time slots. Where the uplink and downlink time slots in a frame can be decided and adjusted adaptively based on system requirements. Such that, for the maximization of uplink performance, more time slots will be dedicated to uplink data reception and vice versa for downlink data transmission in TDD system. Similarly for FDD system, uplink and downlink frequency bandwidths can be decided and adjusted adaptively based on system requirements.

Figure 9:
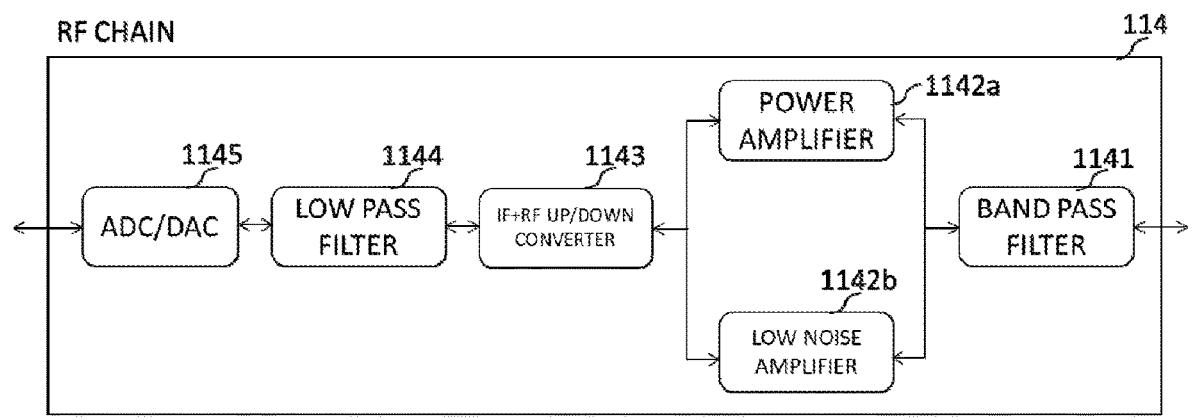
FIG. 9 illustrates an example block diagram of a RF chain in a Remote Radio Head.

FIG. 9 shows an example block diagram of the RF chain 114 included in the RRH 11. Referring to FIG. 9, the RF chain 114 includes a band pass filter 1141, a power amplifier 1142a, a low noise amplifier 1142b, an IF+RF up/down converter 1143, a low pass filter 1144 and an Analog-to-Digital converter (ADC)/Digital-to-Analog converter (DAC) 1145. When data is transmitted to the UTs 2, the RF chain 114 modulates a baseband signal to a radio frequency band. When data is received from the UTs 2, the RF chain 114 demodulates the signal in the radio frequency band to the baseband signal.

Referring to FIG. 3 and the like, the digital interface 115 exchanges data with the BBU 13 via the bidirectional radio interface bus 12.

The RRH 11 steers the analog beamforming towards the directions in both azimuth plane and elevation plane where users are density distributed and/or have comparative higher traffic demands for both uplink and downlink. More details about an operation will be given when a specific example embodiment of the present disclosure are described.

It is noted here, the present disclosure provides a technique for the RRH 11 communicating with any general BBU 13 and the UTs 2. The detailed block diagram and operations of the BBU 13 and the UTs 2 are well known to a skilled person in the art and therefore omitted in this document.

In the following, based on the above-mentioned explanation of common system and devices, details specific to each example embodiment of the present disclosure will be described in respective order.

First Example Embodiment

A first example embodiment will be described more in detail below with reference to the drawings.

In summary, the first example embodiment provides a technique that the RRH 11 monitors signals flowing from the digital interface 115 to each RF chain 114 in the downlink and from each RF chain 114 to the digital interface 115 in uplink. The RRH 11 then estimates at least one metric representing user density distribution and/or traffic demands as a function of spatial direction of analog beamforming. For example, the RRH 11 calculates power levels from in-phase and quadrature components of the digital data flowing between each RF chain 114 and digital interface 115 for the current spatial directions of analog beamforming. The RRH 11 then compares the calculated metric (current estimate) and previous history of the calculated metric (stored estimate) for all other spatial directions. Finally, the RRH re-defines the preferred spatial directions for uplink and downlink to match user density distribution and/or traffic demand.

In the following, details of the first example embodiment are described by making reference to FIG. 10 to FIG. 13.

Figure 10:
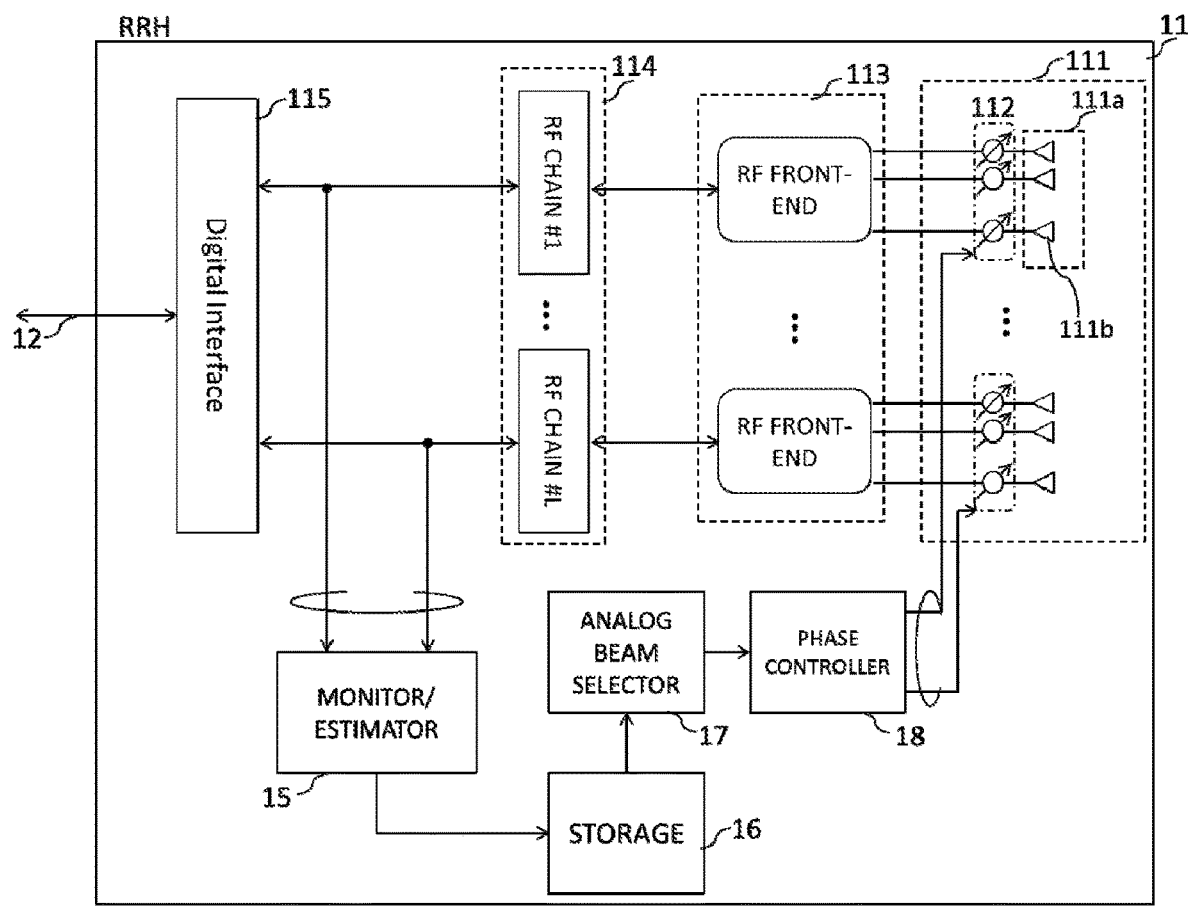
FIG. 10 illustrates an example block diagram of a Remote Radio Head in base transceiver station according to a first example embodiment.

FIG. 10 shows an example block diagram of the RRH 11 according to the first example embodiment. Referring to FIG. 10, the RRH 11 further includes a combined monitor/estimator (combination) 15, a storage 16, an analog beam selector 17 and a phase controller 18. The combined monitor/estimator 15 corresponds to the above-mentioned metric calculator 101. The analog beam selector 17 and phase controller 18 correspond to the above-mentioned beam former 102.

System Operation

Figure 11:
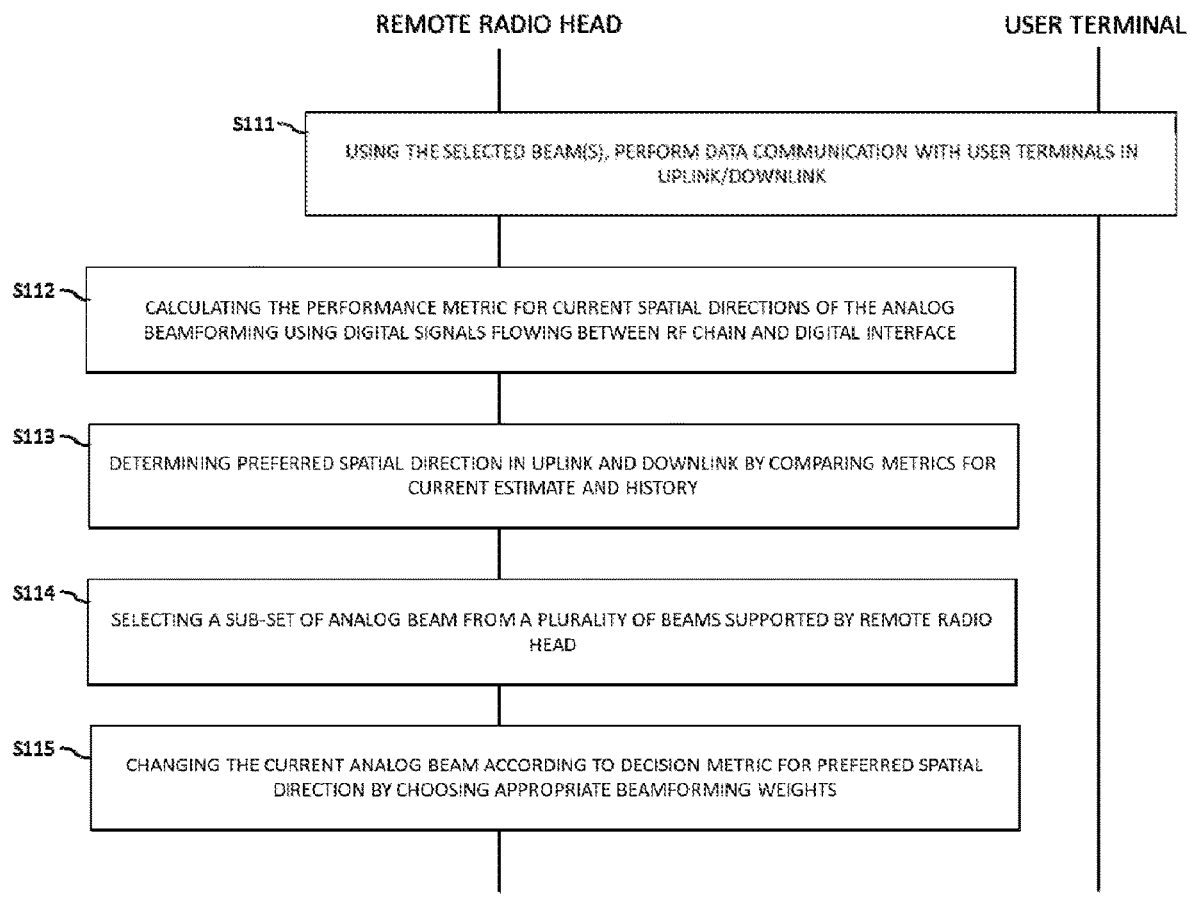
FIG. 11 is a flowchart showing operations of the Remote Radio Head according to the first example embodiment.

FIG. 11 shows an operation of overall system including both the RRH 11 and the UTs 2. At the beginning, the RRH 11 selects sub-set of analog beams from a plurality of analog beams defined by a designer and/or supported in the equipment. It should be noted, the RRH 11 can generate one or more analog beams with same or different beam-width in both azimuth and elevation plane, where one or more beams can be aligned is specific direction. Here, it is assumed that the RRH 11 has already selected some potential analog beam(s) based on previous knowledge on traffic demand and/or user density distribution. Therefore, a first operation S111 shows the RRH 11 communicating with the potential UTs 2 in both uplink and downlink on the specified spatial directions using appropriate analog beamforming.

The combined monitor/estimator 15 monitors the data flowing between each RF chain 114 and the digital interface 115 continuously or on predefined intervals. The combined monitor/estimator 15 then calculates at least one metric representing the traffic demand and/or user density distribution as a function of current spatial directions of analog beamforming (operation S112). For example, one such metric can be obtained by estimating the power levels from the digital signals of each RF chains 114. More specifically, the calculation of one or more metrics is performed by estimating the power levels from the digital data flowing from the digital interface 115 to each RF chain 114 in downlink and vice versa for uplink.

After the calculating the metric, the combined monitor/estimator 15 updates the storage 16. The storage 16, which stores and tracks the calculated metrics for each spatial direction in both up link and downlink, is updated.

After the calculation of at least one metric, the combined monitor/estimator 15 performs comparison of the calculated metric for current spatial direction of analog beamforming with the previously calculated metrics for other spatial directions. The combined monitor/estimator 15 then categorizes the spatial directions for both uplink and downlink based on comparison of metric in uplink and downlink, respectively (operation S113). More specifically, with respect to all spatial directions except the current spatial direction, the combined monitor/estimator 15 classifies the spatial directions having the metric higher than the metric for current spatial direction and the spatial directions having the metric lower than the metric for current spatial direction. The combined monitor/estimator 15 then determines the spatial direction having highest metric as preferred spatial direction in uplink and downlink, respectively. It should be noted that if there is no direction having higher metric, the current spatial direction is determined as the preferred spatial direction. In this way, the combined monitor/estimator 15 determines preferred spatial direction in uplink and downlink by comparing metrics for current estimate and history.

The analog beam selector 17 selects a sub-set of potential spatial directions from a fixed (predetermined) set such that the calculated metric is comparatively higher (operation S114). That is, the analog beam selector 17 selects the sub-set of analog beamforming realizing the determined preferred spatial direction.

Finally, the phase controller 18 performs analog beamforming in the specified direction. The phase controller 18 steers the analog beams in the specified direction by applying appropriate beamforming weights both phase-shifts and amplitude to each antenna element 111*b* (operation S115).

By repeating such monitoring of the data, determination of the preferred spatial direction and changing the spatial direction of the current analog beams, the current spatial direction finally converges to a direction with highest traffic demand.

Based on the explanation of the first example embodiment, it can be concluded that the analog beamforming can be adjusted adaptively in both azimuth plane and elevation plane without duplication of digital interface decoder/encoder functionalities. In addition to that, a precise synchronization to the BBU encoded data is not necessary to estimate the user density distribution and/or traffic demand. This is because of estimation of the metric using the digital signals that flow between the digital interface 115 and the RF chains 114.

To provide a better understanding on the operations of the first example embodiment, we provide two example cases.

<CASE 1: Uplink Reception Only>

Figure 12:
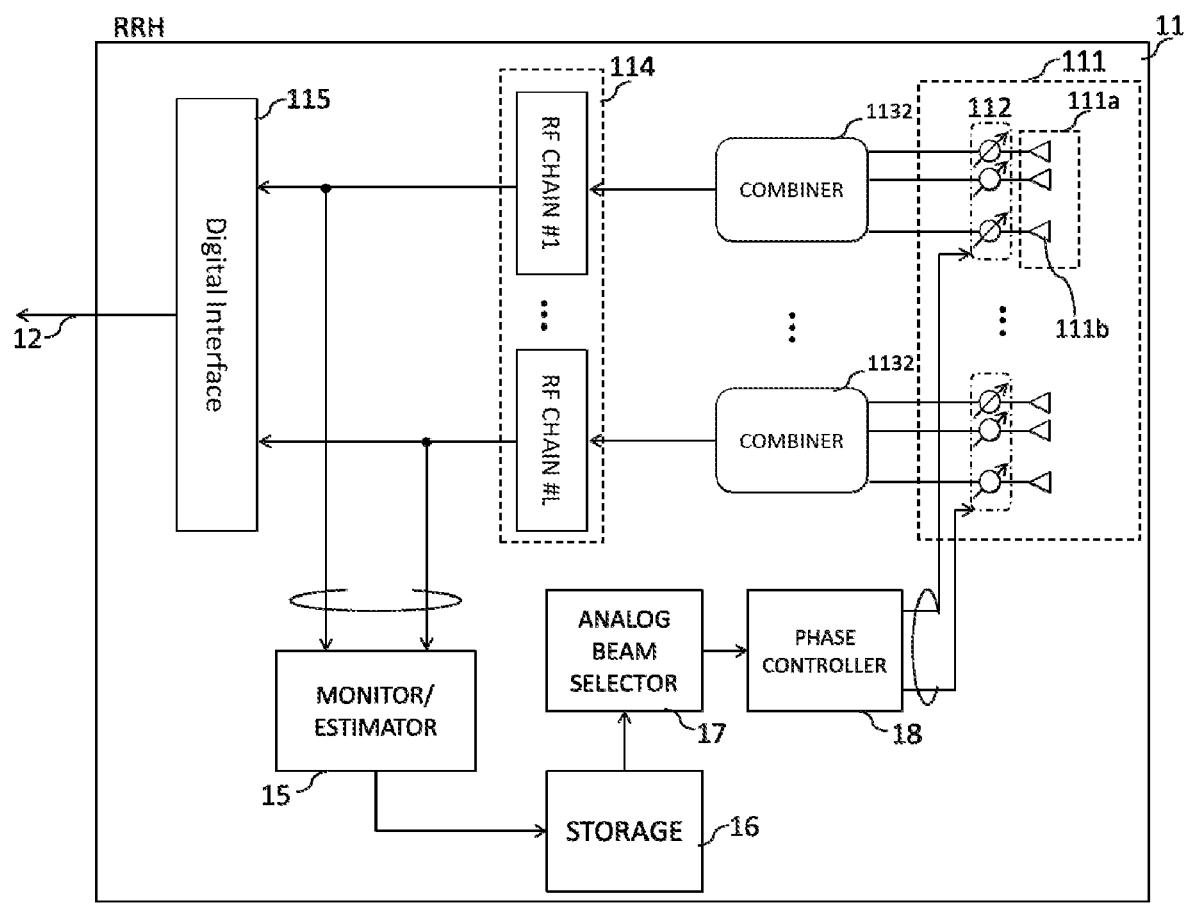
FIG. 12 illustrates an example block diagram of Remote Radio Head for uplink data reception according to the first example embodiment.

For simplicity, let us consider all the sub-arrays 111a are used for only reception of uplink signals from the UTs 2. An example block diagram of the RRH 11 according to the case 1 is shown in FIG. 12 and that is applicable for both TDD and FDD systems, in general.

According to the operation of the first example embodiment, the RRH 11 estimates at least one metric from the uplink received signals representing the user density distribution and/or traffic demand as function of spatial directions of analog beamforming. One such possible metric can be obtained by calculating the power levels from the uplink received signals flowing from each RF chain 114 to the digital interface 115. By using the mathematical notations in the related art of the mobile communication system, the calculated metric from the digital signals of the RF chain #1 (1th RF chain 114) at the RRH 11 can be expressed by following mathematical notations.

$$\gamma_l(\phi_b, \theta_b) = \frac{1}{N} \sum_{n=1}^{N} (I_l(n))^2 + (Q_l(n))^2 \quad \text{[Math. 1]}$$

A corresponding optimization function can be represented as follow;

$$b_{max,l} = \underset{b}{\operatorname{argmax}} \gamma_l(\phi_b, \theta_b) \quad \text{[Math. 2]}$$

$\gamma_l(\phi_b, \theta_b)$ represents the estimated power levels from the received signals for the analog beamforming in the spatial direction of $(\phi_b, \theta_b)$ for $1^{th}$ sub-array 111a, where $\phi_b$ and $\theta_b$ are azimuth angle and elevation angle of the $b^{th}$ beam direction, respectively. $b_{max,1}$ represents the index of the potential beam direction for analog beamforming for $1^{th}$ sub-array 111a. $I_1(n)$ and $Q_1(n)$ are the in-phase and quadrature components of the digital signal of the RF chain #1 at time instant n, respectively. It should be noted here, use of power levels for calculating metric is only to simplify the explanation. Operation S113 to S115 of the RRH 11 have been explained in previous sub-section, therefore, detailed explanation is omitted here for conciseness.

<CASE 2: Downlink Transmission Only>

Figure 13:
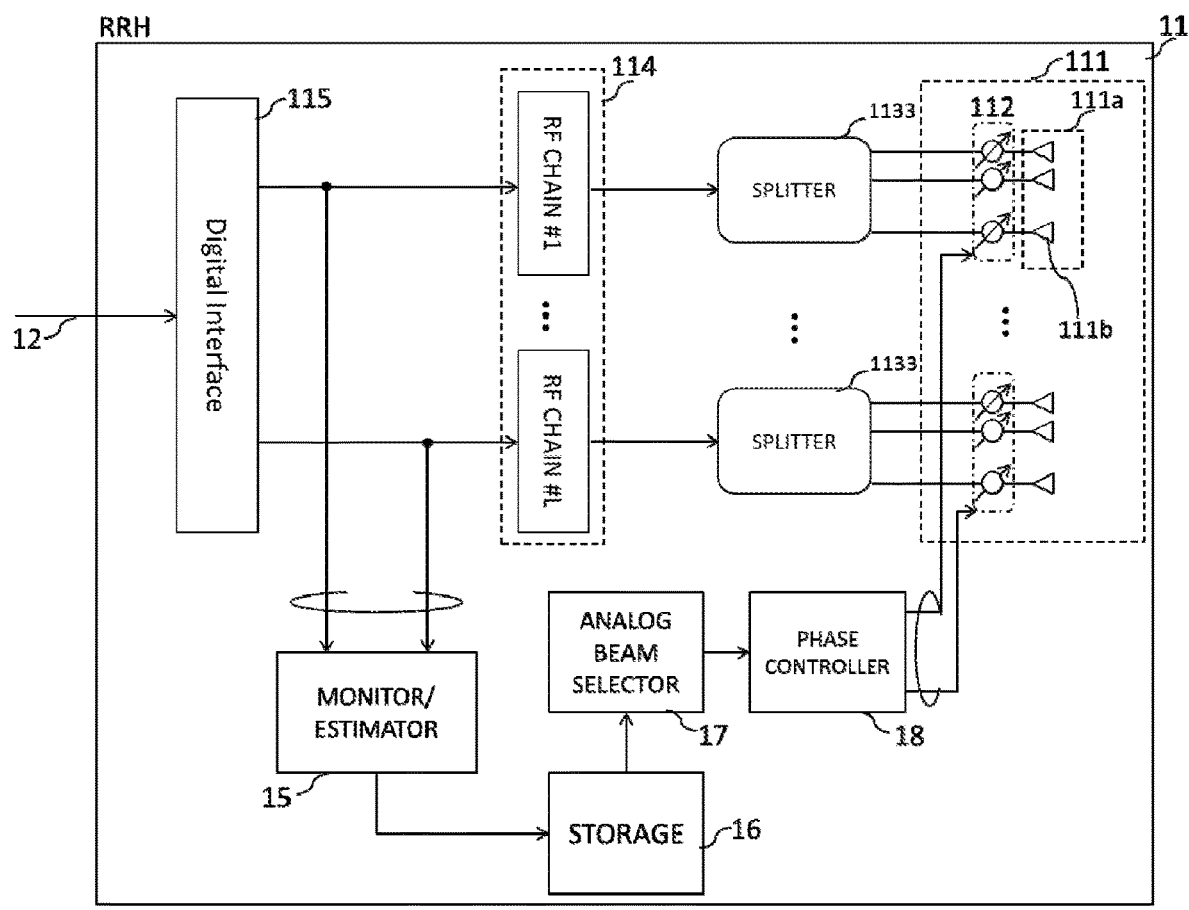
FIG. 13 illustrates an example block diagram of Remote Radio Head for downlink data transmission according to the first example embodiment.

For simplifying an explanation of case 2, let us consider all the sub-arrays 111a are only used for transmission of downlink signals to the UTs 2. An example block diagram of the RRH 11 according to the case 2 with this assumption is shown in FIG. 13 and that is applicable to for both TDD and FDD systems, in general.

According to the operation of the first example embodiment, the RRH 11 first estimates at least one metric from the transmit downlink signals that represents the user density distribution and/or traffic demands as the function of spatial directions of analog beamforming. One such possible metric can be computed based on estimating the power levels from the data of each RF chain 114, when Maximum Ratio Transmission (MRT) scheme is adopted by the BBU 13 for downlink data transmission. More precisely, when a transmitter is equipped with more than one transmit antenna and/or sub-arrays that are concurrently transmitting same data; signal delivered to each antenna and/sub-array is weighted by a scaling factor that is proportional to a complex channel coefficient between transmitting and receiving antennas. By using the mathematical notations in the related art of mobile communication system, the scaling factor for the sub-array #1 can be expressed as follow, $$v_l = \frac{h_l^*}{[\sum_{l=1}^{L} |h_l|^2]^{1/2}} \quad \text{[Math. 3]}$$

The transmitted signal s vector from the BBU 13, can be represented as follow, $$s = cv = \frac{c}{[\sum_{l=1}^{L} |h_l|^2]^{1/2}} [h_1 \ \ldots \ h_L]^H \quad \text{[Math. 4]}$$

Where, $h_1$ represents a composite complex channel coefficient between sub-array #1 and the UTs 2. $h_l^*$ represents a complex conjugate of $h_1$. In math.4, H represents Hermitian transpose. c is data symbols for transmission in downlink and v is a weight vector applied to generate a transmitted signal vector s from the BBU 13. Similar to case 1, by calculating the power from the components of transmit signals vector s we can estimate user density distribution and/or traffic demands. Let $s_1$ be the transmit signal for the RF chain #1, such that, the calculated performance metric for the RF chain #1 can be expressed as by following mathematical notations;

$$\gamma_l(\phi_b, \theta_b) = \frac{1}{N} \sum_{n=1}^{N} |s_l(n)|^2 \quad \text{[Math. 5]}$$

A corresponding optimization function can be represented as follow, $$b_{max,l} = \underset{b}{\operatorname{argmax}} \gamma_l(\phi_b, \theta_b) \quad \text{[Math. 6]}$$

$\gamma_l(\phi_b, \theta_b)$ represents the estimated power levels from the transmitted signals for analog beamforming in the spatial direction of $(\phi_b, \theta_b)$ for $1^{th}$ sub-array 111a, where $\phi_b$ and $\theta_b$ are the azimuth angle and elevation angle of the b-th beam direction, respectively. $b_{max,1}$ represents the index of the potential beam direction for analog beamforming for $1^{th}$ sub-array 111a. Operations S113 to S115 of the RRH 11 for the first example embodiment have been explained in previous sub-section. Therefore, detailed explanation is omitted here for conciseness.

Second Example Embodiment

In summary, a second example embodiment makes one modification to the first example embodiment. The second example embodiment introduces to calculates at least one metric representing the user density distribution and/or traffic demand from analog signals of each RF chain 114. For example, the RRH 11 calculates the power levels from the analog signals within each RF chain 11 and/or from the analog signals between each RF chain 114 and the RF front end 113.

After comparison of the estimated powers from the analog signal for current spatial direction and history, the RRH 11 re-defines the preferred spatial direction(s) for uplink and downlink data reception and transmission, respectively.

Based on such addition, the second example embodiment modifies functionalities of hardware components used for calculating metric representing the traffic demand and/or user distributions as function of spatial directions.

In the following, details of the second example embodiment are described by making reference to FIG. 14 to FIG. 17.

Figure 14:
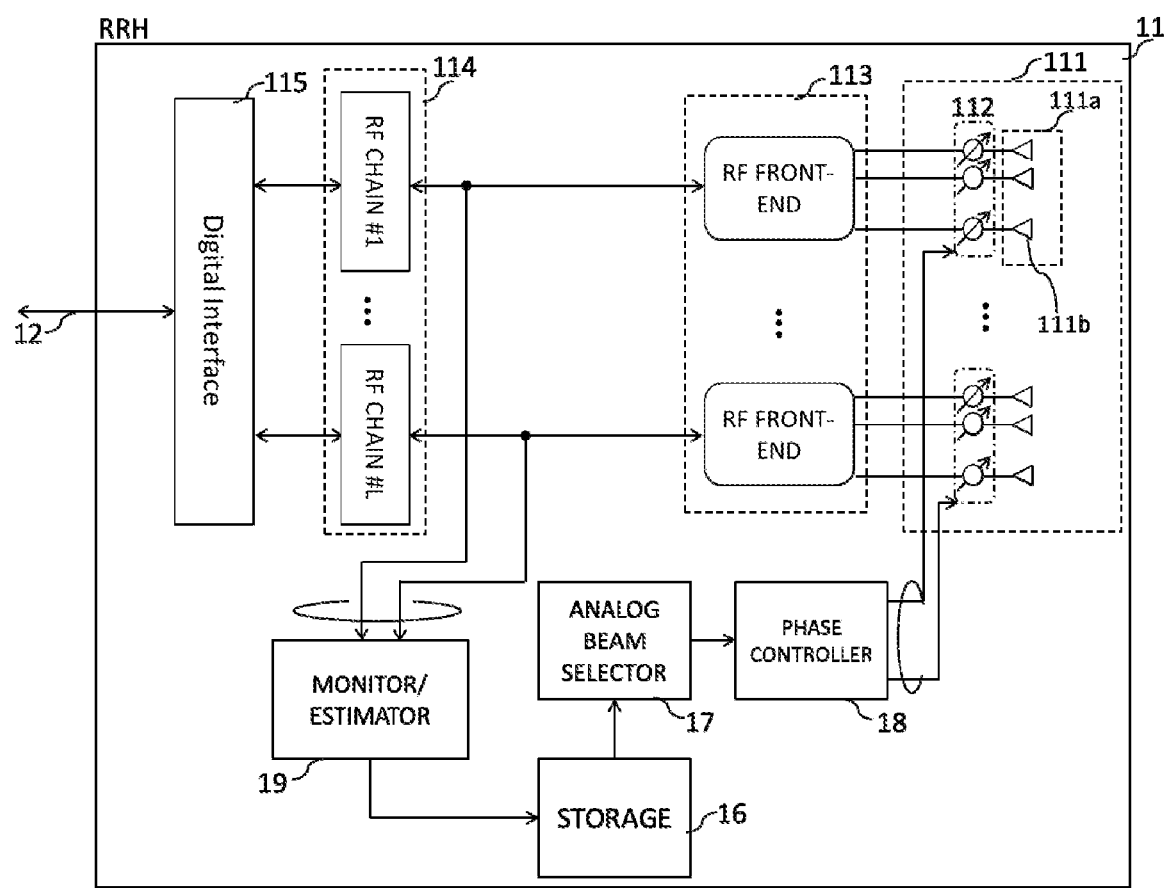
FIG. 14 illustrates an example block diagram of a Remote Radio Head in base transceiver station according to a second example embodiment.

FIG. 14 shows an example block diagram of the RRH 11 according to the second example embodiment. Referring to FIG. 14, the RRH 11 includes a combined monitor/estimator 19 instead of the combined monitor/estimator 15. The combined monitor/estimator 19 differs from the combined monitor/estimator 15 in that the combined monitor/estimator 19 monitors the analog signals.

Figure 15:
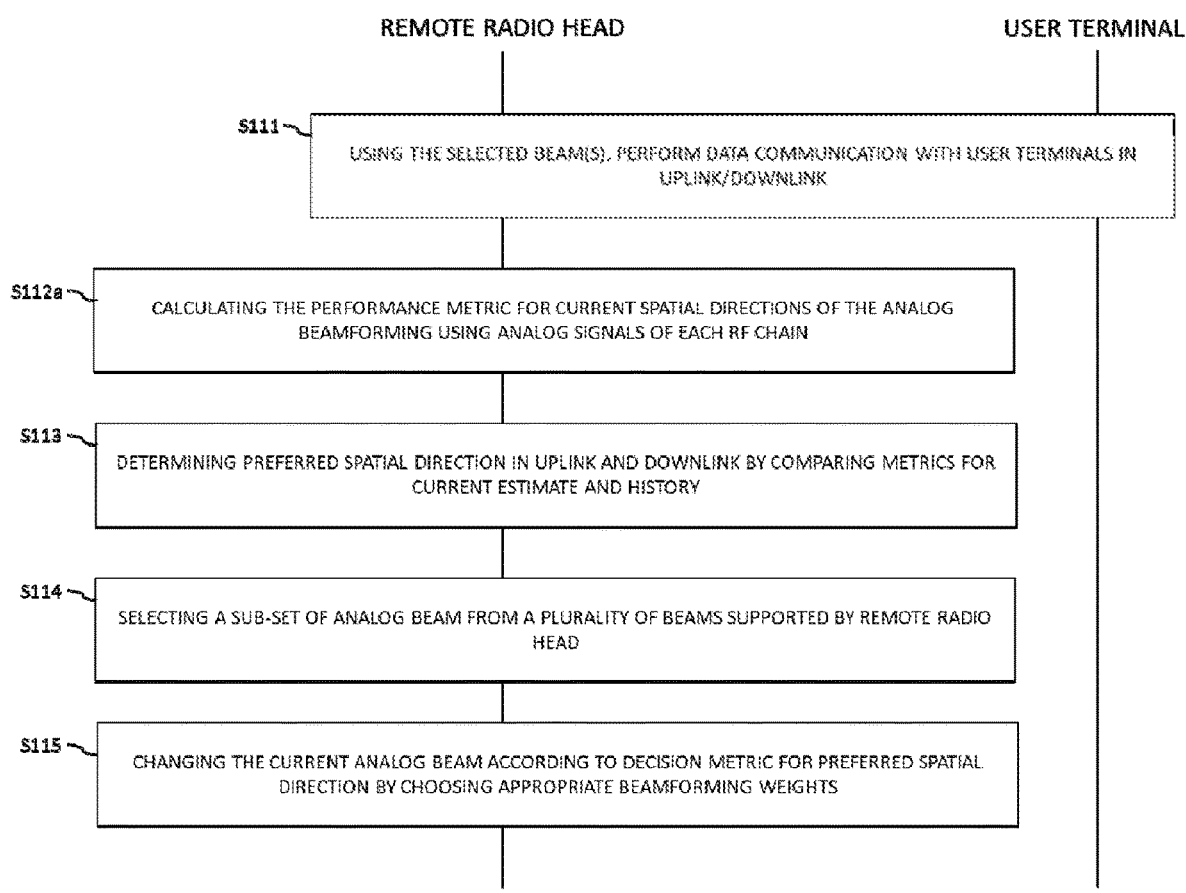
FIG. 15 is a flowchart showing operations of the Remote Radio Head according to the second example embodiment.

FIG. 15 shows an operation of overall system including of both the RRH 11 and the UTs 2. The first operation S111, which selects a sub set of potential spatial directions for analog beamforming and communicates with the UTs 2 in both uplink and downlink, have been explained in previous embodiment, therefore detailed explanation is omitted for conciseness.

The combined monitor/estimator 19 monitors the data flowing within each RF chain 114 and/or the data flowing between each RF chain 114 and RF front-end 113 continuously or on pre-defined intervals. The combined monitor/estimator 19 then calculates at least one metric representing the traffic demand and/or user density distribution as a function of current spatial directions of analog beamforming (operation S112a).

For example, such metric can be obtained by calculating the power levels from the analog signals at the output of DAC or the input of ADC included in ADC/DAC 1145 in downlink and uplink, respectively. In addition, such metric can also be calculated from the analog signals flowing between ADC/DAC 1145 and the low-pass filter 1144 or between low-pass filter 1144 and the IF+RF Up/Down convertor 1143 and/or in the same way between any of two components of the RF chain 114 that are mentioned or not mentioned in the example block diagram of the RF chain 114 shown in FIG. 9.

Similarly, the power can also be calculated from the analog signals at the output and input of each RF chain 114 in downlink and uplink, respectively. In other words, power can be estimated from the signal flowing out of each RF chain 114 to each RF front-end 113 in downlink and vice versa for uplink.

The last three operation, which are determining the spatial direction of uplink and downlink based on power comparison (operation S113), selecting a set of potential spatial directions for analog beamforming (operation S114) and finally applying appropriate beamforming weights both phase-shifts and amplitude to each phase-shifter for steering beam in specified direction (operation S115) are same as the first example embodiment. Therefore, detailed explanation of these operations is omitted for conciseness.

Figure 16:
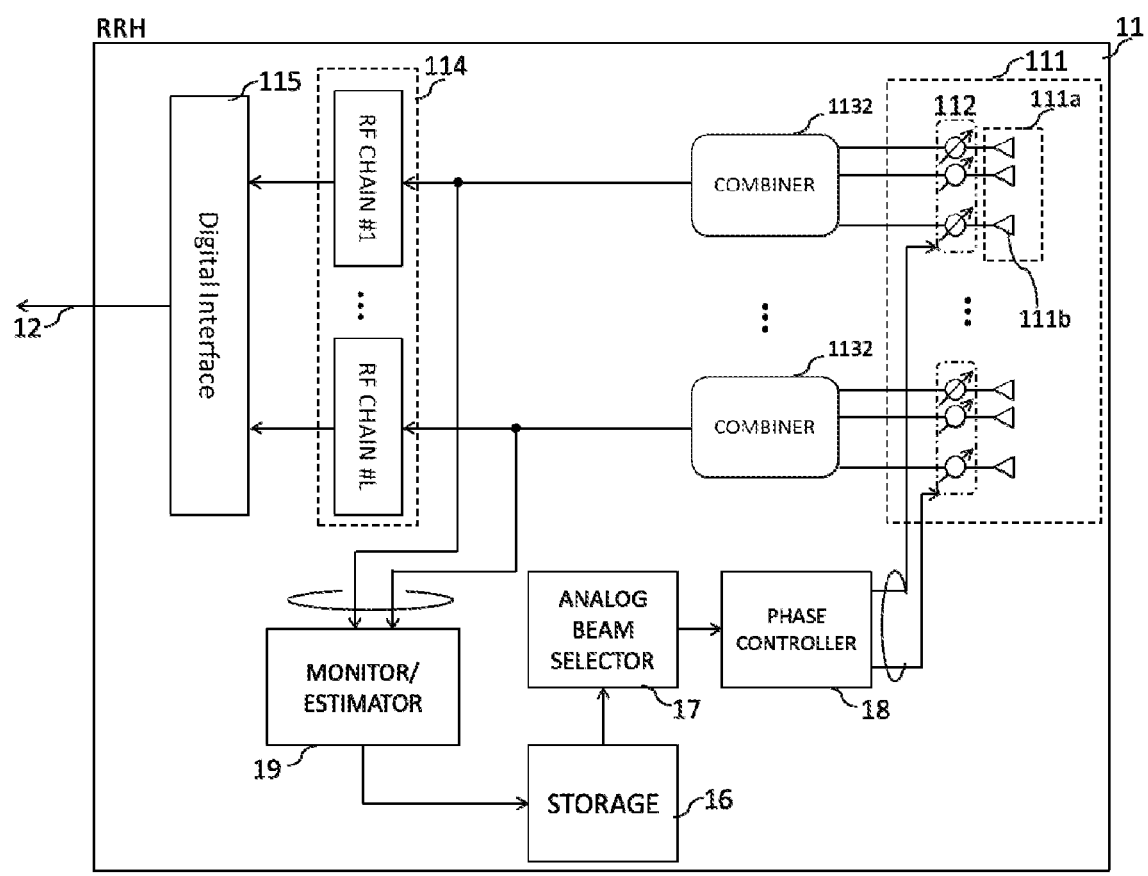
FIG. 16 illustrates an example block diagram of Remote Radio Head for uplink data reception according to the second example embodiment.
Figure 17:
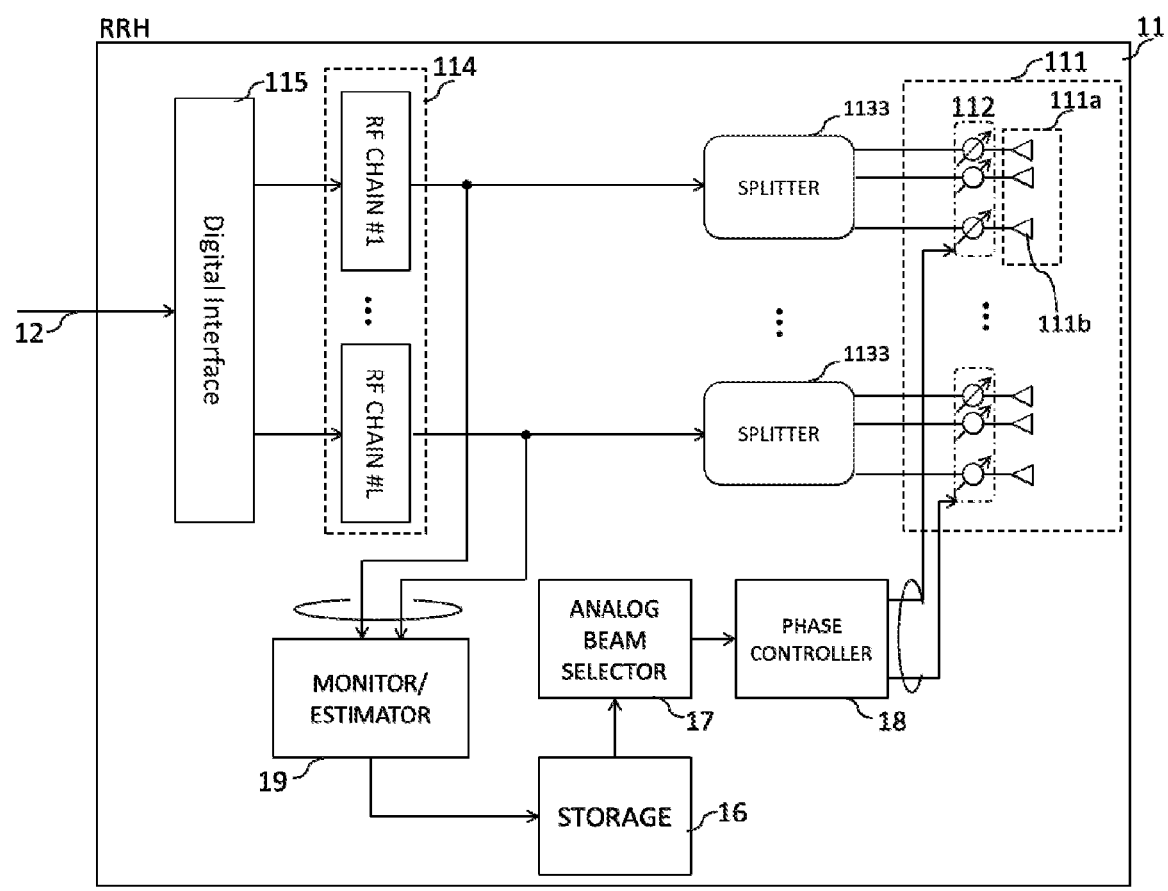
FIG. 17 illustrates an example block diagram of Remote Radio Head for downlink data transmission according to the second example embodiment.

In addition, similar to the first example embodiment, in the second example embodiment, all the sub-arrays 111a can be used for only reception of uplink signals from the UTs 2 (FIG. 16). Further, similar to the first example embodiment, in the second example embodiment, all the sub-arrays 111a can be only used for transmission of downlink signals to the UTs 2 (FIG. 17).

Based on the explanation of the second example embodiment, it can be concluded that second example embodiment further improves the first example embodiment. Specifically, use of analog signals for calculating the metrics will result in a compact architecture for the RRH 11. This is because; external components used for estimating the traffic demand and/or user density distribution can easily be integrated with phase-shifter network in single chip architecture.

Note that the application of the first example embodiment and second example embodiment is not limited to the examples used in the previous explanations. On the contrary, an essence of the first example embodiment and second example embodiment can be applied to various scenarios by a skilled person in the art.

Figure 18:
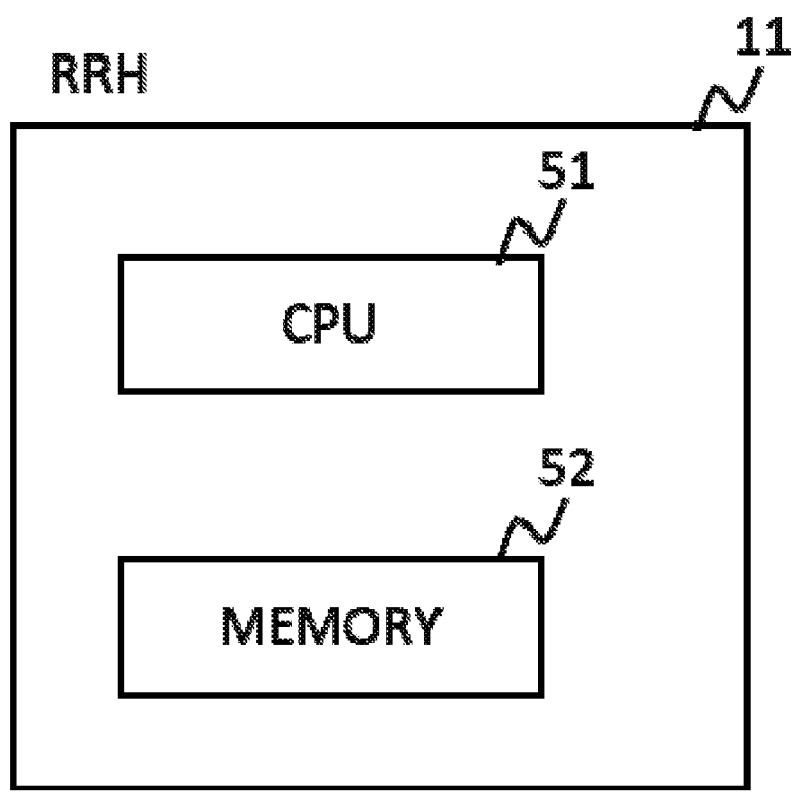
FIG. 18 illustrates a block diagram showing a hardware configuration of a Remote Radio Head.

The functions of the RRH 11 (for example, the combined monitor/estimator 15) can be realized by the processor embedded on the RRH 11 (refer to FIG. 18). For example, the RRH 11 includes a CPU (Central Processing Unit) 51 and a memory 52. For example, the processing module such as the combined monitor/estimator 15 can be realized by that the CPU 51 executes a program stored in the memory 52. Further, the program can be updated by downloading the program via a network or a storage medium storing the program.

As mentioned above, the present disclosure adapts the Hybrid Analog-Digital beamforming architecture, where a sub-set of antennas share one common RF chain. In addition, the present disclosure is not limited to uplink received signals. It can easily be applied to downlink signals in order to estimate the downlink traffic demand in the network (For example, CASE 2: Downlink Transmission Only). Furthermore, the present disclosure proposes a Radio Unit standalone operation, such that, there is no interaction or communication between Radio Unit and Baseband Unit for estimation of traffic demands.

In addition, in the present disclosure, the analog beams are directed to the regions with higher traffic demands considering both uplink and downlink traffic. More precisely, in order to maximize the uplink performance, more analog beams will be directed to regions with higher uplink traffic. Similarly, in order to minimize the downlink performance, more analog beams will be aligned to regions with higher downlink traffic demands.

Preferred modes will now be recited.

(Mode 1)

Mode 1 is the same as the remote radio head according to the first aspect.

(Mode 2)

The remote radio head according to Mode 1, wherein the metric calculator is configured to calculate the metric using digital downlink signals inputted to each the Radio Frequency chain or using analog uplink signals inputted to each the Radio Frequency chain.

(Mode 3)

The remote radio head according to Mode 1, wherein the metric calculator is configured to calculate the metric using digital uplink signals outputted from each the Radio Frequency chain or using analog downlink signals outputted from each the Radio Frequency chain.

(Mode 4)

The remote radio head according to Mode 1, wherein the metric calculator is configured to calculate the metric using signals flowing within each the Radio Frequency chain.

(Mode 5)

The remote radio head according to any one of Modes 1 to 4, wherein the metric calculator is configured to calculate the metric using measured power level from the signals of each the Radio Frequency chain.

(Mode 6)

The remote radio head according to Mode 5, wherein the metric calculator is configured to calculate the metric using measured power level from the signals of each the Radio Frequency chain in digital domain.

(Mode 7)

The remote radio head according to Mode 5, wherein the metric calculator is configured to calculate the metric using estimates of power level from the signals of each the Radio Frequency chain in analog domain.

(Mode 8)

The remote radio head according to any one of Modes 1 to 7, wherein the beam former is configured to select a subset of potential beams, which match to the traffic demand, from a fixed set.

(Mode 9)

The remote radio head according to Mode 8, wherein the beam former is configured to select the subset of potential beams that match to traffic demands and user distribution in both azimuth and elevation.

(Mode 10)

The remote radio head according to any one of Modes 1 to 9, wherein the metric calculator is configured to compare the calculated metric for current spatial direction with metrics calculated previously for spatial directions except the current spatial direction.

(Mode 11)

The remote radio head according to Mode 10, wherein the metric calculator is configured to determine a preferred spatial direction in uplink and downlink based on a result of the comparison.

(Mode 12)

The remote radio head according to any one of Modes 1 to 11, further comprising a storage configured to store the calculated metric for each spatial direction.

(Mode 13)

Mode 13 is the same as the beamforming method according to the second aspect.

(Mode 14)

Mode 14 is the same as the program according to the third aspect.

The disclosure of Patent Literature given above is hereby incorporated by reference into this specification. The example embodiments may be changed and adjusted within the aspect of the entire disclosure (including claims) of the present invention and based on the basic technological concept. Within the scope of the claims of the present invention, various disclosed elements may be combined and selected in a variety of ways. That is, it is to be understood that modifications, changes as well as selections and combinations of elements that may be made by those skilled in the art within the entire disclosure of the present invention are requested to be included.

REFERENCE SIGNS LIST

1 Base Transceiver Station
2 User Terminal
11 Remote Radio Head
12 bidirectional radio interface bus
13 Base Band Unit (BBU, Base Band circuit)
15, 19 combined monitor/estimator
16 storage
17 analog beam selector
18 phase controller
51 CPU
52 Memory
101 metric calculator
102 beam former
111 BTS antennas
111a sub-array
111b antenna element
112 phase-shifter
113 RF front-end
114 RF chain
115 digital interface
1131 receive/transmit switch
1132 combiner
1133 splitter
1135 duplexer
1141 band pass filter
1142a power amplifier
1142b low noise amplifier
1143 IF+RF up/down converter
1144 low pass filter
1145 Analog-to-Converter/Digital-to-Analog Converter

What is claimed is:

1. A remote radio head comprising:
a plurality of sub-arrays, each having a plurality of antenna elements;
a plurality of Radio Frequency chains, each performing transformation from a digital baseband signal received via a digital interface from a baseband unit to an RF (radio frequency) signal and from an RF signal received to a digital baseband signal that is to be sent via the digital interface to the baseband unit;
a plurality of RF front ends, each performing at least one of transmission of RF signals to the antenna elements of the corresponding sub-array and synthesis of RF signals received from the antenna elements of the corresponding sub-array;
a plurality of sets of phase shifters, each set connected between the corresponding RF front end and the antenna elements of the corresponding sub-array;
the digital interface that performs at least one of transmission and reception of a digital signal to and from the plurality of the Radio Frequency chains;
a memory storing program instruction; and
a processor connected to the memory and configured to:
monitor a power level of at least a signal inputted to or outputted from each of the Radio Frequency chains;
calculate at least one metric representing a traffic demand as a function of spatial direction, by using at least the power level of the at least the signal inputted to or outputted from the each of the Radio Frequency chains;
determine a spatial direction, based on the at least one metric currently calculated and metrics calculated previously; and
control each set of phase shifters corresponding to the each of the Radio Frequency chains to direct analog beams towards the spatial direction.

2. The remote radio head according to claim 1, wherein the processor calculates the metric by computing the power level of a digital downlink signal inputted to each of the Radio Frequency chains via the digital interface from the baseband unit.

3. The remote radio head according to claim 1, wherein the processor calculates the metric by calculating the power level of a digital uplink signal outputted from each of the Radio Frequency chains to the baseband unit via the digital interface.

4. The remote radio head according to claim 1, wherein the processor calculates the metric by measuring the power level of an analog uplink signal inputted from each of the RF front ends to each of the Radio Frequency chains.

5. The remote radio head according to claim 1, wherein the processor calculates the metric by measuring the power level of an analog downlink signal outputted from each of the RF chains to each of the RF front ends.

6. The remote radio head according to claim 1, wherein the processor selects a subset of potential beams that match to the traffic demand and a user distribution in both azimuth and elevation.

7. The remote radio head according to claim 1, wherein the processor compares the calculated metric for current spatial direction with the metrics calculated previously for spatial directions except the current spatial direction; and
determines the spatial direction having a highest metric as a preferred spatial direction.

8. The remote radio head according to claim 7, wherein the processor, in case there is no logged spatial direction having the highest metric, determines the current spatial direction as the preferred spatial direction.

9. The remote radio head according to claim 1, further comprising a storage that stores the calculated metric for each spatial direction.

10. The remote radio head according to claim 1, wherein each of the RF front ends includes:
at least one of a splitter that has a single input port and multiple output ports and receives a signal at the single input port from the each of the Radio Frequency chains to split the signal into multiple output ports signals for supply to the antenna elements of the sub-array; and
a combiner that has multiple input ports and a signal output port and receives signals at the multiple input ports from the antenna elements of the sub-array to combine the signals into a single output port signal for supply to the each of the Radio Frequency chains.

11. The remote radio head according to claim 1, wherein a digital downlink signal generated on a Maximum Ratio Transmission (MRT) scheme is inputted to each of the Radio Frequency chains via the digital interface from the baseband unit.

12. A beamforming method performed in a remote radio head including: a plurality of sub-arrays, each having a plurality of antenna elements;
a plurality of Radio Frequency chains, each performing transformation from a digital baseband signal received via a digital interface from a baseband unit to an RF (radio frequency) signal and from an RF signal received to a digital baseband signal that is to be sent via the digital interface to the baseband unit;
a plurality of RF front ends, each performing at least one of transmission of RF signals to the antenna elements of the corresponding sub-array and synthesis of RF signals received from the antenna elements of the corresponding sub-array;
a plurality of sets of phase shifters, each set connected between the corresponding RF front end and the antenna elements of the corresponding sub-array; and
the digital interface that performs at least one of transmission and reception of a digital signal to and from the plurality of the Radio Frequency chains,
the method comprising:
monitoring a power level of at least a signal inputted to or outputted from each of the Radio Frequency chains; and
calculating at least one metric representing a traffic demand as a function of spatial direction, by using at least the power level of the at least the signal inputted to or outputted from the each of the Radio Frequency chains;
determining a spatial direction, based on the at least one metric currently calculated and metrics calculated previously; and
controlling each set of phase shifters corresponding to the each of the Radio Frequency chains to direct analog beams towards the spatial direction.

13. The beamforming method according to claim 12, wherein comprising:
calculating the metric by computing the power level of a digital downlink signal inputted to each of the Radio Frequency chains via the digital interface form the baseband unit.

14. The beamforming method according to claim 12, wherein comprising:
calculating the metric by calculating the power level of a digital uplink signal outputted from each of the Radio Frequency chains to the baseband unit via the digital interface.

15. The beamforming method according to claim 12, wherein comprising:
calculating the metric by measuring the power level of an analog uplink signal inputted from each of the RF front ends to each of the Radio Frequency chains.

16. The beamforming method according to claim 12, wherein comprising:
calculating the metric by measuring the power level of an analog downlink signal outputted to each of the RF front ends from each of the Radio Frequency chains.

17. A non-transitory computer-readable storage medium storing a program executed by a computer embedded on a remote radio head including: a plurality of sub-arrays, each having a plurality of antenna elements;
a plurality of Radio Frequency chains, each performing transformation from a digital baseband signal received via a digital interface from a baseband unit to an RF (radio frequency) signal and from an RF signal received to a digital baseband signal that is to be sent via the digital interface to the baseband unit;
a plurality of RF front ends, each performing at least one of transmission of RF signals to the antenna elements of the corresponding sub-array and synthesis of RF signals received from the antenna elements of the corresponding sub-array;
a plurality of sets of phase shifters, each set connected between the corresponding RF front end and the antenna elements of the corresponding sub-array; and
the digital interface that performs at least one of transmission and reception of a digital signal to and from the plurality of the Radio Frequency chains,
the program causing the computer to execute:
monitoring a power level of at least a signal inputted to or outputted from each of the Radio Frequency chains; and
calculating at least one metric representing a traffic demand as a function of spatial direction, by using at least the power level of the at least the signal inputted to or outputted from the each of the Radio Frequency chains; and determining a spatial direction, based on the at least one metric currently calculated and metrics calculated previously; and controlling each set of phase shifters corresponding to the each of the Radio Frequency chains to direct analog beams towards the spatial direction.

* * * * *